W. H. STRICKLER.
AMUSEMENT DEVICE FOR USE IN PLEASURE PARKS.
APPLICATION FILED JULY 22, 1909.
1,094,948.
Patented Apr. 28, 1914.
7 SHEETS—SHEET 1.
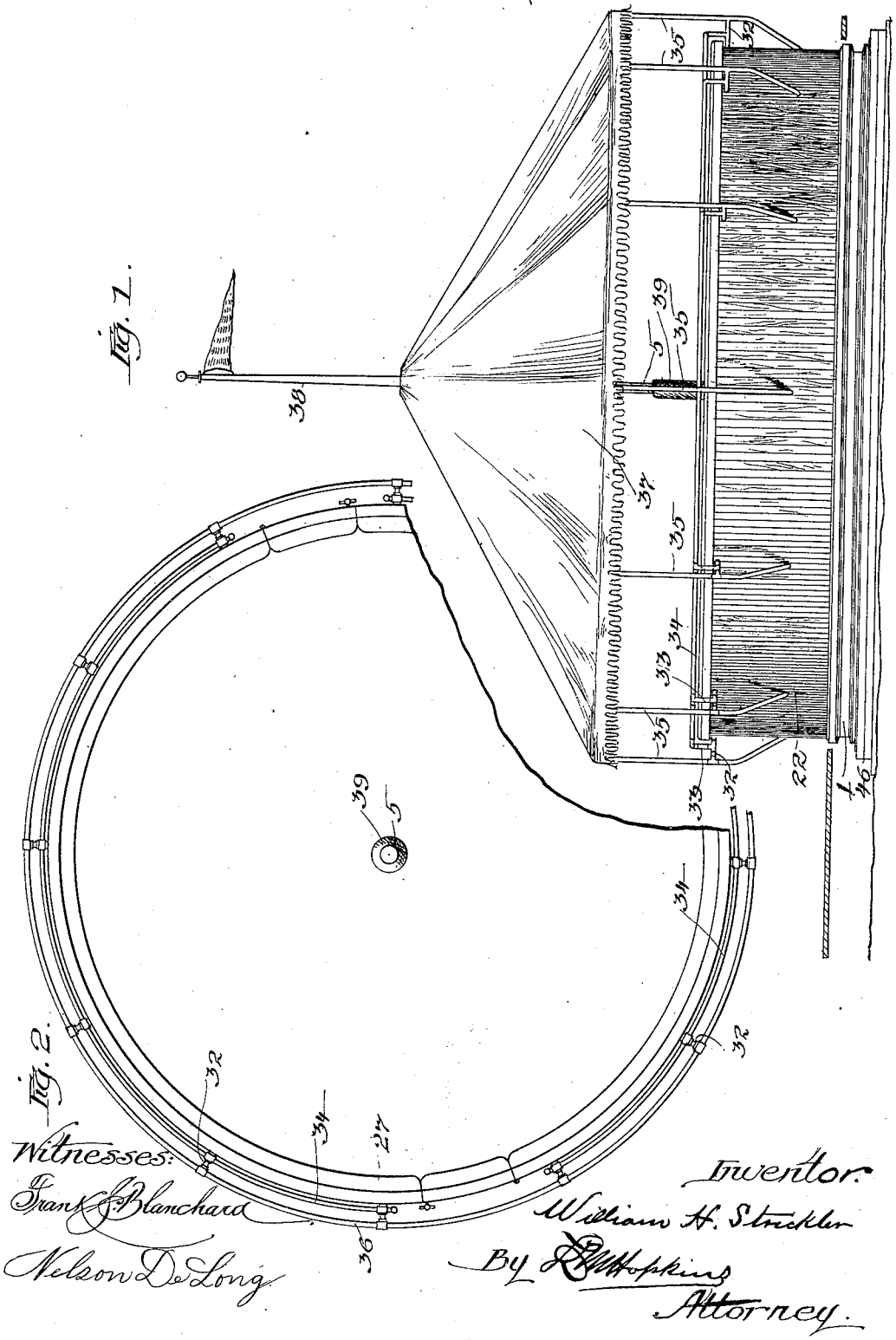

W. H. STRICKLER.
AMUSEMENT DEVICE FOR USE IN PLEASURE PARKS.
APPLICATION FILED JULY 22, 1909.
1,094,948.
Patented Apr. 28, 1914.
7 SHEETS—SHEET 2.
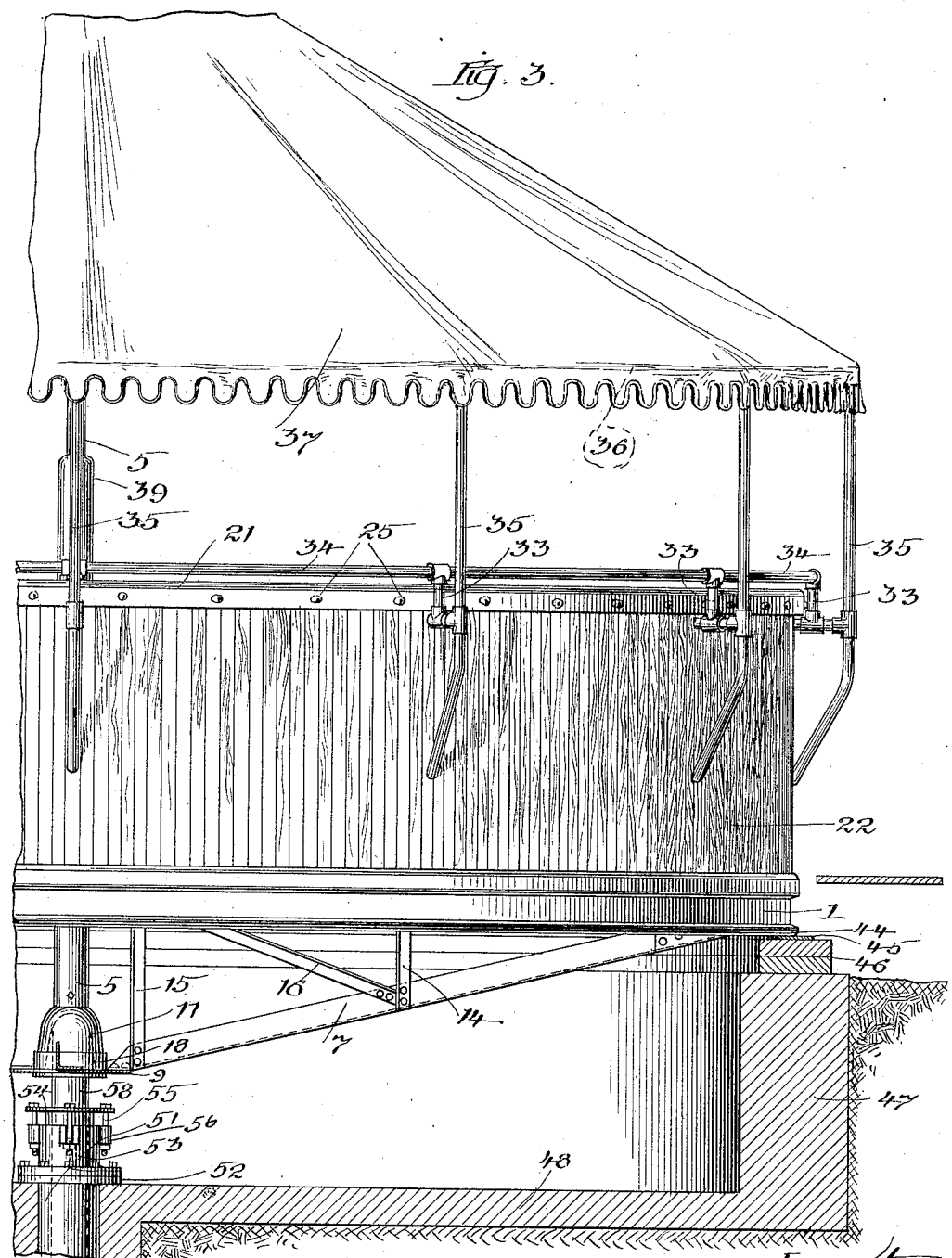

W. H. STRICKLER.
AMUSEMENT DEVICE FOR USE IN PLEASURE PARKS.
APPLICATION FILED JULY 22, 1909.
1,094,948.
Patented Apr. 28, 1914.
7 SHEETS—SHEET 3.
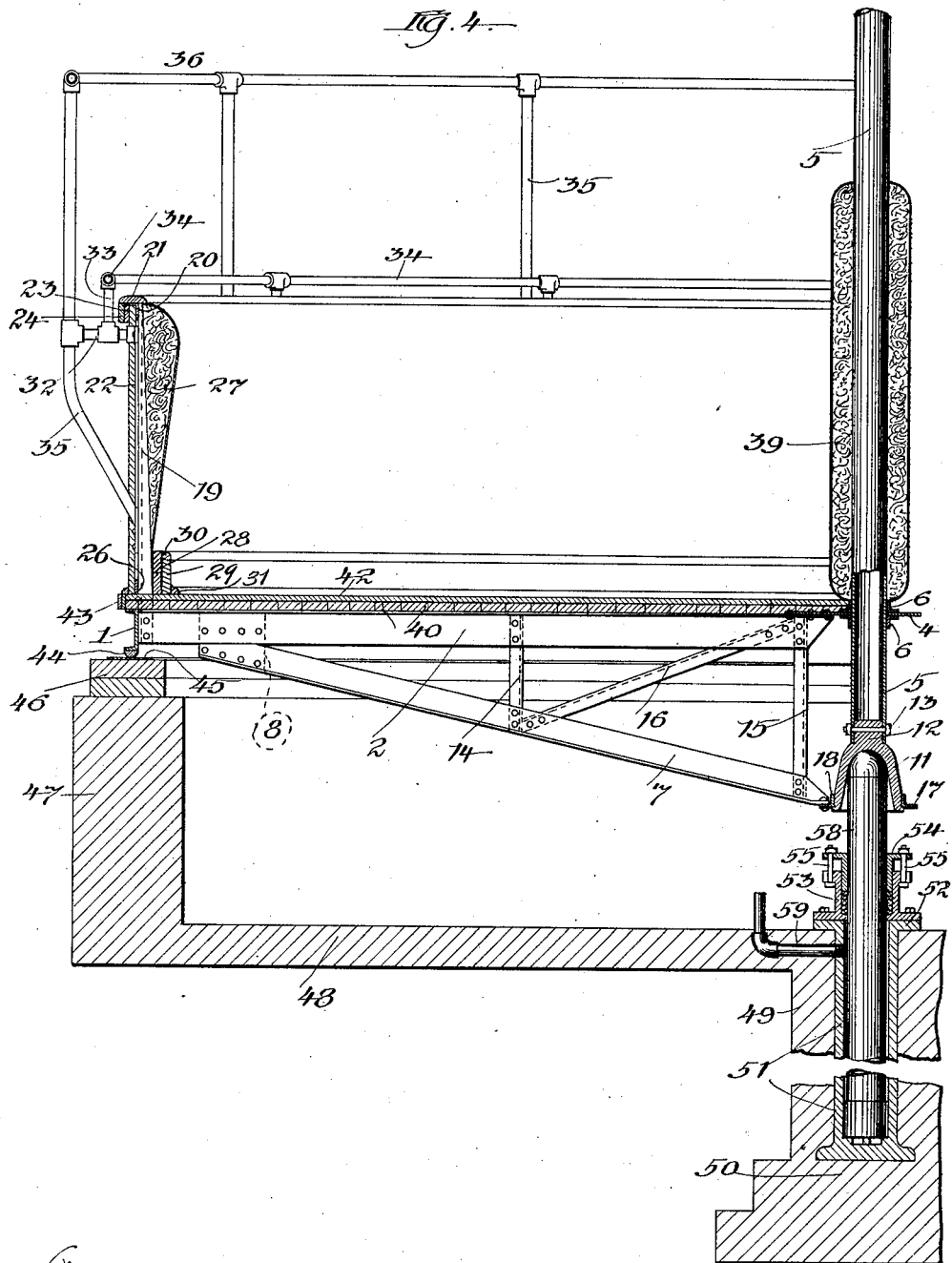

W. H. STRICKLER.
AMUSEMENT DEVICE FOR USE IN PLEASURE PARKS.
APPLICATION FILED JULY 22, 1909.
1,094,948.
Patented Apr. 28, 1914.
7 SHEETS—SHEET 3.
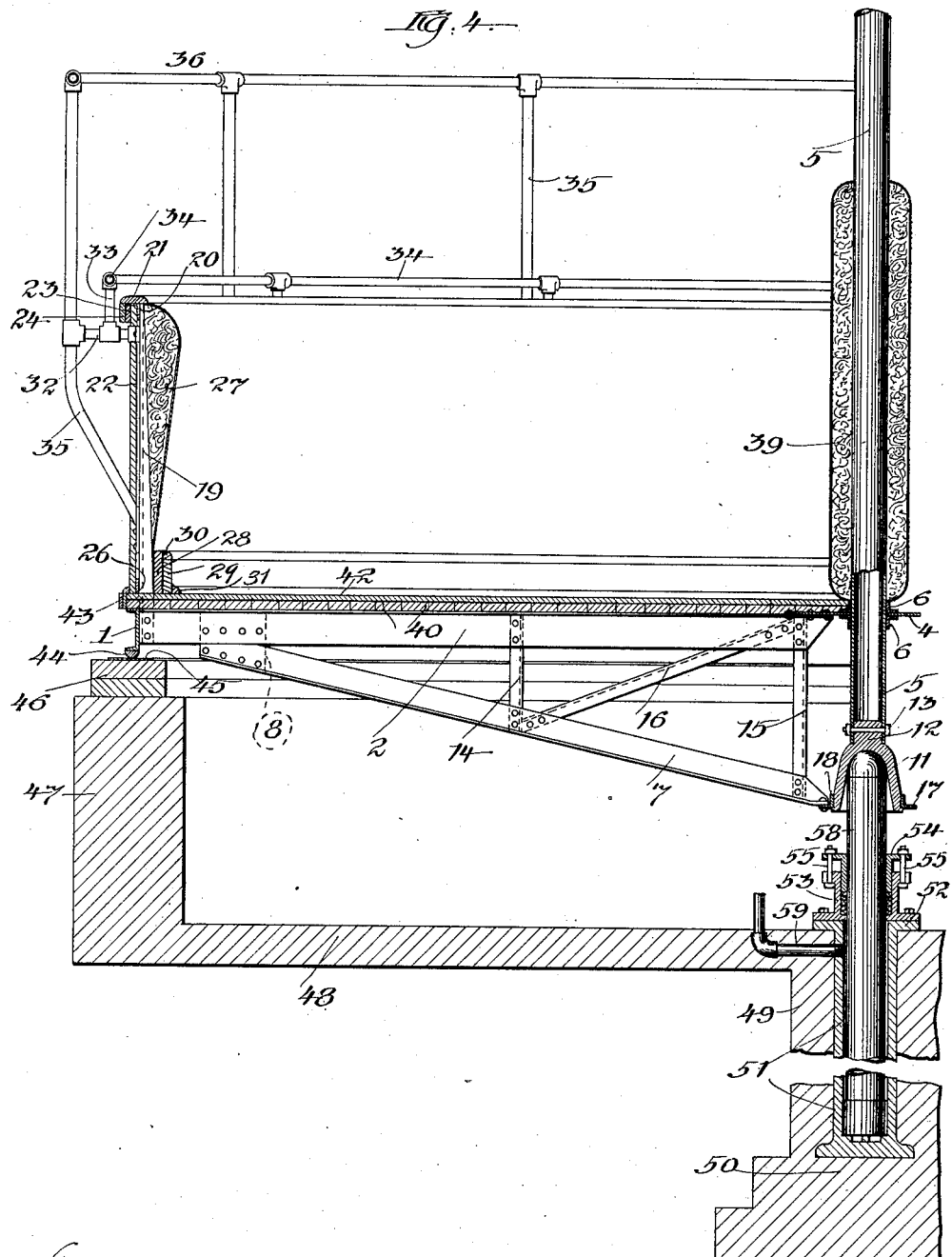
Witnesses:
Frank J. Blanchard
Nelson DeLong
Inventor:
William H. Strickler
By ............
Attorney.

W. H. STRICKLER.
AMUSEMENT DEVICE FOR USE IN PLEASURE PARKS.
APPLICATION FILED JULY 22, 1909.
1,094,948.
Patented Apr. 28, 1914.
7 SHEETS—SHEET 4.
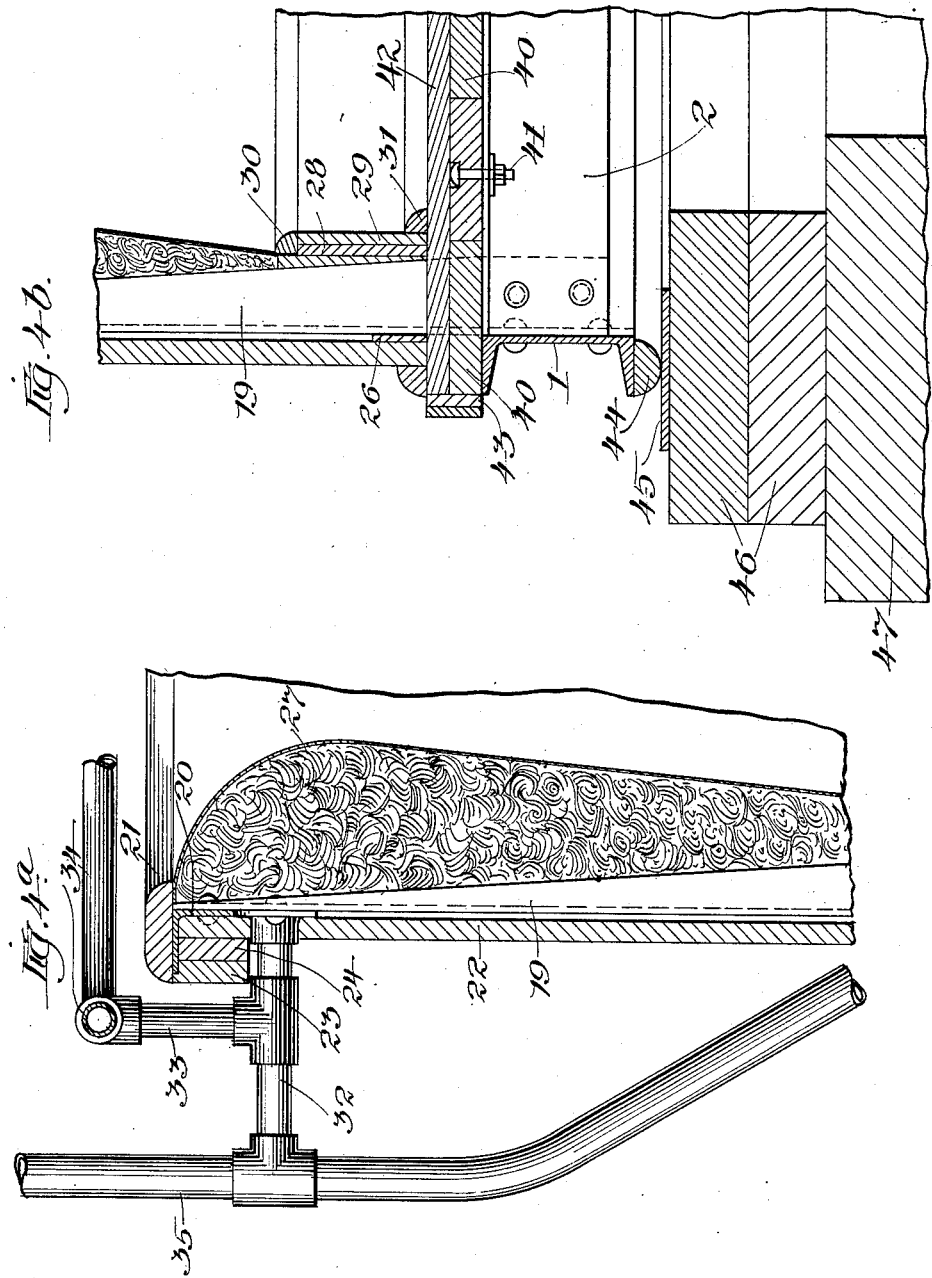

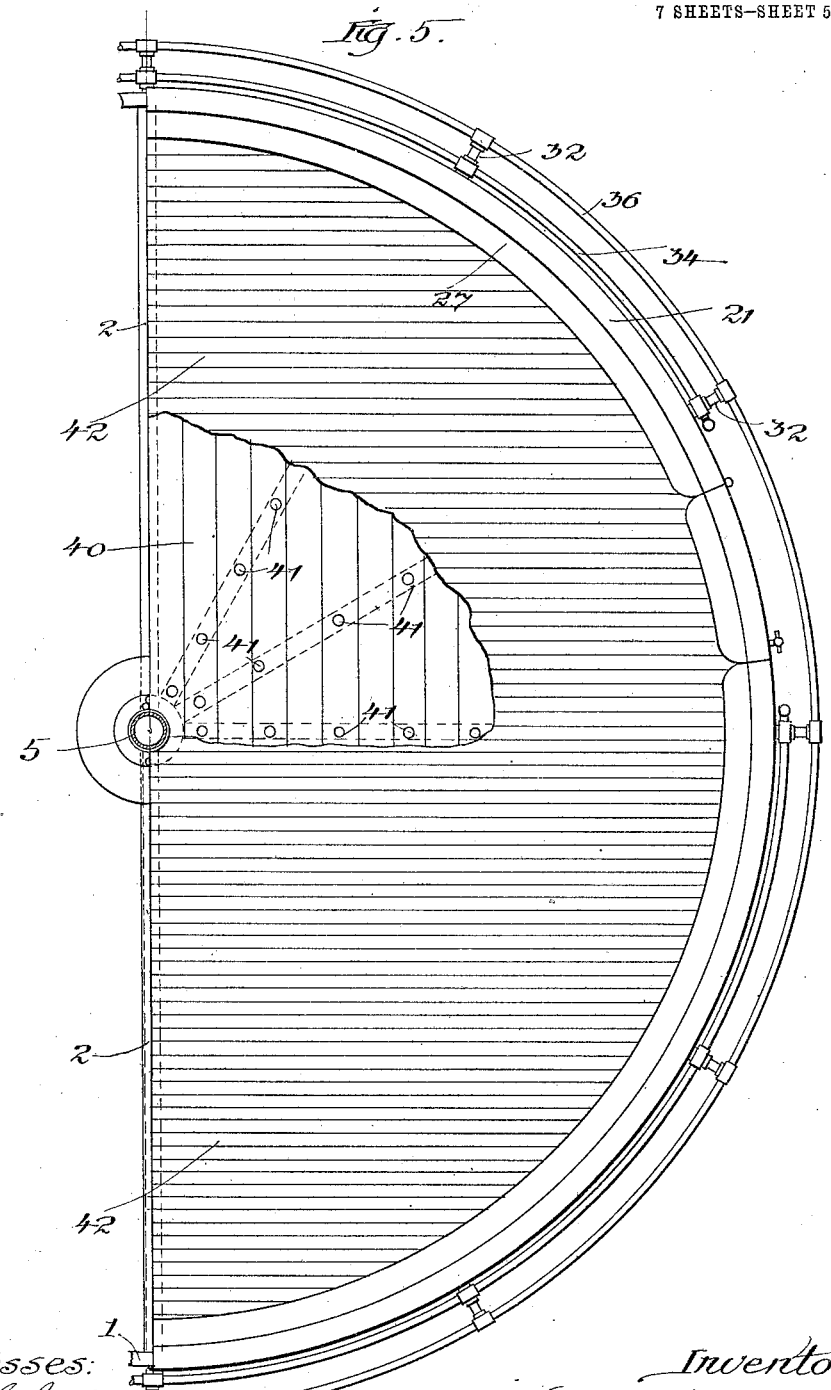
W. H. STRICKLER.
AMUSEMENT DEVICE FOR USE IN PLEASURE PARKS.
APPLICATION FILED JULY 22, 1909.
1,094,948.
Patented Apr. 28, 1914.
7 SHEETS—SHEET 5.

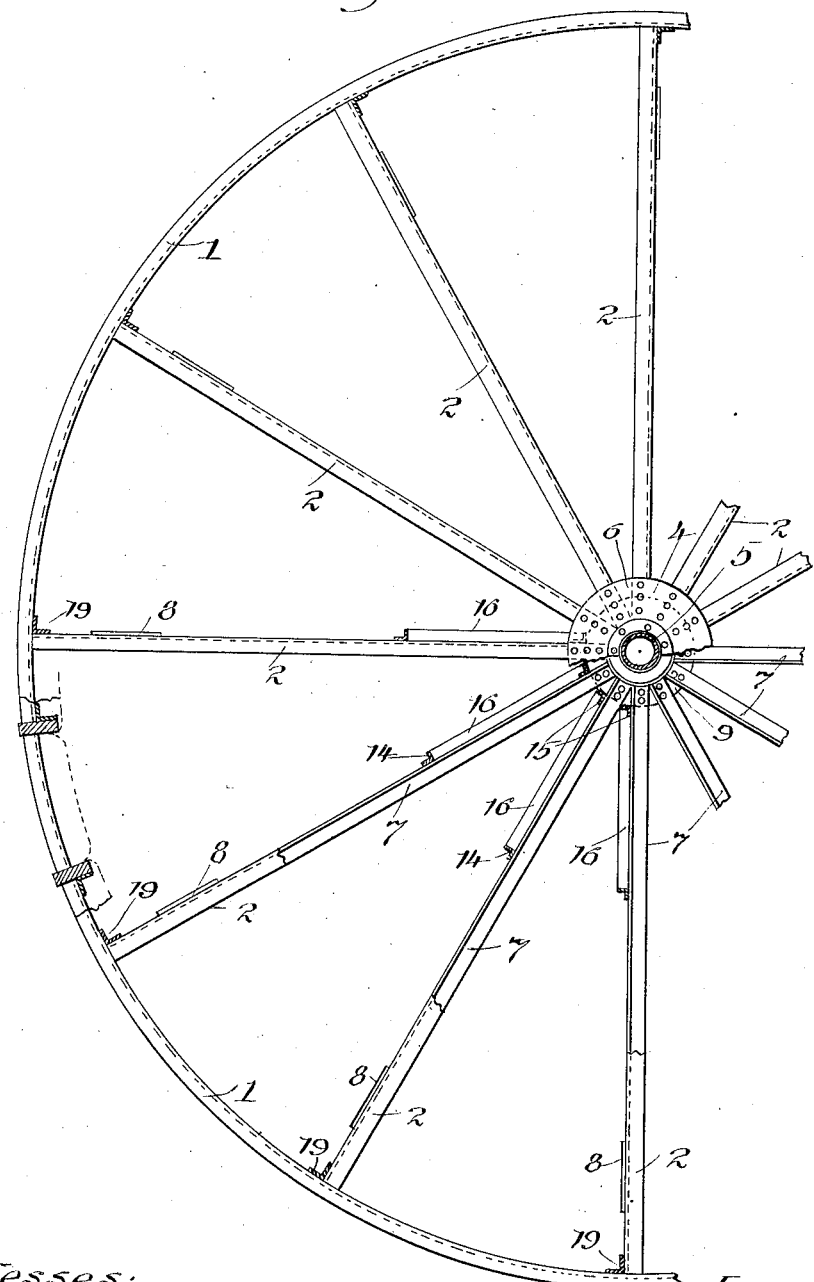

W. H. STRICKLER.
AMUSEMENT DEVICE FOR USE IN PLEASURE PARKS.
APPLICATION FILED JULY 22, 1909.
1,094,948.
Patented Apr. 28, 1914.
7 SHEETS—SHEET. 7.
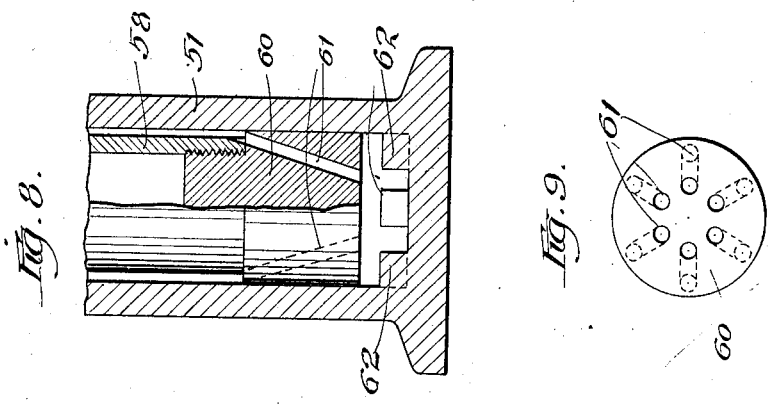
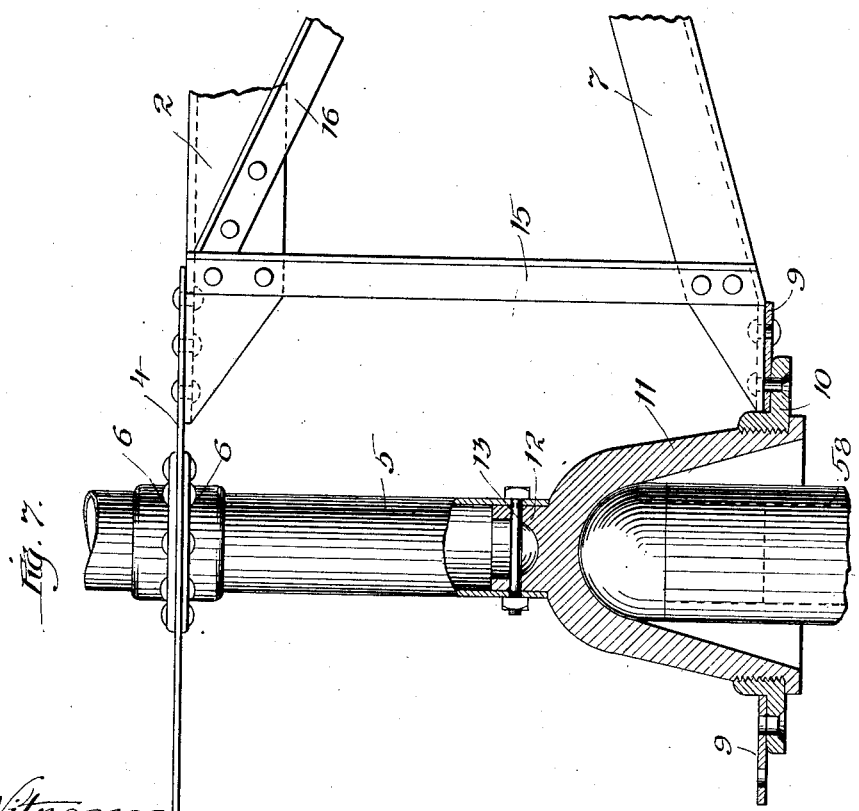

UNITED STATES PATENT OFFICE.

WILLIAM H. STRICKLER, OF CHICAGO, ILLINOIS, ASSIGNOR TO FEDERAL CONSTRUCTION COMPANY, OF CHICAGO, ILLINOIS, A CORPORATION OF ILLINOIS.

AMUSEMENT DEVICE FOR USE IN PLEASURE-PARKS.

1,094,948. Specification of Letters Patent. Patented Apr. 28, 1914.

Application filed July 22, 1909. Serial No. 508,978.

*To all whom it may concern:*

Be it known that I, WILLIAM H. STRICKLER, a citizen of the United States, residing at Chicago, in the county of Cook and State of Illinois, have invented certain new and useful Improvements in Amusement Devices for Use in Pleasure-Parks, of which the following is a specification.

The present invention relates to that class of devices that are used in amusement parks for affording amusement to the patrons of the park but which may, of course, be used in places other than amusement parks, such, for example, in circuses, as side shows, public parks, etc.

The object of the invention is to provide a device, belonging to the general class mentioned, which will produce novel effects and sensations upon persons patronizing it. These effects and sensations are accomplished by the use of a platform, preferably circular, which is capable of tilting or oscillating universally and upon which any number of persons, within the capacity of the device, may stand, the platform being provided with a side wall or sheathing for preventing them from falling off, and a lifting jack, preferably hydraulic, or other lifting device, engaging the platform at a single central or practically central point, whereby the platform may be raised and lowered, the engaging surfaces of the platform and plunger of the lifting jack (sometimes called "ram" when the jack is hydraulic) or other lifting device being of such shape that the platform may oscillate or tilt in any direction. When the platform is in its lowermost position it is at rest; any number of persons may walk upon it. If the lifting device be then raised, it will elevate the platform at all points excepting at the side carrying the preponderance of the load. The distribution of the load will be unequal, owing to the different positions of the persons on the platform. This will disturb the equilibrium of the persons on the high side of the platform when it is lifted and they will either voluntarily, or involuntarily shift their positions. This will shift the point of preponderance and this will, in turn, shift the position of the platform. This shifting of the platform will disturb the equilibrium of some of the persons and their positions will be shifted voluntarily or involuntarily and again change the point of preponderance and shift the position of the platform. The shifting of the positions of the persons on the platform will not always be involuntary with all persons. Some will shift their positions voluntarily so as to purposely shift the platform and disturb the equilibrium of the more timid persons against their volition and jumble them up, "just for the fun of the thing". There would be no fun about the matter if all of the persons should huddle together at the low side of the platform and thereby hold it at rest. But this is not likely to occur.

To these ends the invention consists in the features of novelty that are hereinafter described with reference to the accompanying drawings in which:

Figure 1 is a side elevation on a small scale showing as much of the improved amusement device as is located above the level of the ground. Fig. 2 is a plan view thereof with the awning omitted. Fig. 3 is a side elevation of one half thereof. Fig. 4 is a vertical central section of the other half thereof. Figs. 4$^a$ and 4$^b$ are vertical views of certain details. Fig. 5 is a plan view of the half shown in Fig. 3 with the awning omitted. Fig. 6 is a plan view of the framework of the platform of that half of the device which is shown in Fig. 4, the flooring of the platform and all parts above it being omitted. Fig. 7 is a sectional elevation of the central parts of the platform framework. Fig. 8 is a view of the lower portion of a hydraulic jack for lifting the platform, one half of the lower portion of the plunger of the hydraulic jack being shown in elevation and the other half in vertical section and the cylinder being shown in vertical section. Fig. 9 is a view of the lower end of the plunger or ram of the hydraulic lifting jack.

The frame of the platform has an outer circular sill 1, made of channel iron, which forms the boundary or support for the outer margin of the floor of the platform, a plurality of horizontal beams 2, made of angle iron arranged radially with respect to the platform and with their horizontal flanges uppermost, their outer ends being secured to the circular sill 1 through the medium of the lower ends of standards 19 and their inner ends being secured to a disk 4, which latter has a centrally located opening through which passes a tubular post 5, the central part of the disk 4, being secured between flanges on a two-part collar 6, which surrounds and is secured to the post 5.

7 are diagonal or inclined braces made of angle iron, and disposed with their horizontal flanges on their lower sides, said braces being radial with respect to the platform. Their outer ends are secured to the vertical flanges of the horizontal beams 2, through the medium of a plate 8, and their inner ends are secured to a disk 9, which in turn is secured to a radial flange on a collar 10 which is screwed on to the lower portion of a flaring socket 11, which forms the base of the hollow post 5, the socket having at top a projection 12, which extends into the tubular post 5, and is there secured by a bolt 13. The horizontal beams 2, and diagonal braces 7 are connected by vertical braces 14, and 15, and also by diagonal or inclined braces 16, which extend from the lower ends of the braces 14, upwardly to the upper ends of the braces 15.

Instead of securing the inner ends of the braces 7, to a separate disk 9, secured to the radial flange of the collar 10, screwed to the socket 11, as above described and as shown in Fig. 7, their inner ends may be secured directly to a radial flange 17, of a collar 18, secured by any suitable means to the socket 11, as shown in Fig. 4. The inner ends of the diagonal braces being rigidly secured to the socket 11, which latter forms the base of the hollow post, the inner ends of the horizontal beams 2, being rigidly secured to the post, the outer ends of the horizontal beams being rigidly secured to the outer circular sill 1, the outer ends of the diagonal braces being rigidly secured to the horizontal beams, and the diagonal braces and horizontal beams being rigidly connected by vertical and diagonal braces, the result is an absolutely rigid frame-work for the platform Secured to and rising from the frame-work at suitable intervals are standards 19, made of angle iron, one flange of which is presented inward and tapers or is of graduated depth from bottom to top terminating at top in the plane of the inner face of the other flange. Secured to the upper ends of each of these standards is an angle plate 20, one of the flanges of which is horizontal and extends outward and these horizontal flanges support a rail 21, circular and preferably made of oak. Outside of the standards 19, is a circular wall or sheathing 22, preferably made of ceiling boards. At its upper end this wall or sheathing is held against outward movement or deflection by a pair of circular bands 23 and 24 which are secured together at short intervals, say 12 inches, by bolts 25. At its bottom portion the wall or sheathing is prevented from moving inward by a ring 26, which surrounds the bottom of the standards. This ring 26 maintains the shape of the bottom portion of the wall and, as before stated, there being no tendency to force the upper portion inward, it is not necessary to provide at the upper portion a ring or any other means on the interior of the wall for maintaining it against inward displacement. The heavy bands 23 and 24 surrounding the outside of the wall are for the purpose of preventing and resisting its outward movement or deflection under the influence of the force resulting from the falling or striking of the persons on the platform against a pad or cushion 27, with which the wall is covered throughout. The wall is four feet high, more or less, and the cushion extends from its top downward being graduated in thickness from top to bottom. At bottom the wall is protected and prevented from being forced inward by a circular ring 28, which is supported against outward movement by the standards 19 and this ring is faced on its interior by a foot board 29, fillets 30 and 31 being arranged at top and bottom of the foot board to prevent sharp angles.

Secured to each of the standards is a horizontal arm 32 and each of these arms carries at an intermediate point in its length a post 33 extending vertically upward slightly above the level of the rail 21. These posts carry at their upper ends a circular hand rail 34 which may be grasped by the persons on the platform if they desire to steady themselves and prevent themselves from being thrown about by the oscillating movement of the platform.

To each of the standards 19 is secured the lower end of a post 35 which is bent so that its lower portion inclines upward and outward while its upper portion is vertical. At a point intermediate of its length, each of these posts 35 is engaged by the outer end of the arm 32, whereby it is braced. These posts carry at their upper ends a circular ring 36 for supporting the outer portion of an awning 37, the apex of which is secured to the upper portion of the hollow post 5 or to a flag staff 38, which rises from the hollow post.

For a suitable distance from the floor of the platform the post is surrounded by a cushion 39 for preventing persons from being injured as they are thrown about. The floor consists of a layer 40, of heavy boards laid parallel and in contact with each other upon the horizontal flanges of the beams 2, being secured thereto at suitable points by bolts 41, and a layer 42 of maple flooring laid upon the boards 40 at right angles thereto. The floor thus constructed is surrounded at its margin by concentric bands 43, by which the boards are prevented from endwise displacement.

The circular sill 1, carries on its under side a circular wear-ring 44, of semi-circular cross section, which, when the platform is in its lowermost position rests throughout upon a steel track-ring 45, and when the platform is inclined only that portion of the wear-ring 44, which is at the lowermost side of the platform contacts with the ring 45. This ring 45 is supported by a pair of superposed rings 46, which surround a circular pit, the walls 47 and the bottom 48 of which are made of concrete. At the center of this pit is a well or circular bore the sides 49 and the bottom 50, of which are also of concrete and integral with the bottom 48 of the pit, the bottom 50 being massive in order to prevent settling under the weight of the device and the persons on the platform.

The cylinder 51 of the hydraulic jack is embedded in the concrete which forms the sides 49, and the bottom 50 of the well extending downward from the pit and said cylinder has at top a radial flange 52 which rests upon the bottom 48 of the pit. Surmounting this cylinder is a stuffing box consisting of a short cylinder 53 having at bottom a radial flange bolted to the flange 52 of the cylinder, a gland 54 having a flange perforated for the passage of bolts 55, a plurality of pairs of parallel lugs 56, extending outwardly from the upper portion of the cylinder 53 and adapted to receive the bolts 55 between them by lateral movement of the bolts and nuts turned on to the threaded ends of the bolts and engaging the under sides of the lugs whereby the glands 54 may be drawn into the cylinder 53 and thereby compress the packing 57 contained in an enlarged portion of the bore of the cylinder 53.

A plunger or ram 58, extends into the cylinder 51, passes upward through the stuffing box and extends into the flaring socket 11. The upper end of the plunger or ram 58 is hemispherical and the upper portion of the socket is of complementary shape while from this hemispherical portion the socket flares downward. The object of these shapes is to permit the platform to tilt or oscillate in any direction as the preponderance of the load or weight upon it changes from point to point as already described.

For the purpose of raising the plunger or ram, water or other liquid under pressure is admitted to the cylinder through pipe 59 and this pipe also serves for the escape of the liquid from the cylinder when the plunger or ram is to be lowered. Throughout the greater portion of its length the plunger or ram is of slightly less diameter than the interior of the cylinder, but at its lower end the plunger or ram has an enlarged head 60 which has a piston-fit within the cylinder and this enlarged head has through it, from top to bottom, diagonal or inclined ducts or passages 61 the upper ends of which communicate with the annular space between the cylinder and the plunger or ram. These ducts or passages permit the water or other liquid under pressure to have contact with the under side of the enlarged head of the plunger or ram in order to raise it, and when it is desired to lower it, they permit the water or other liquid to escape from beneath the plunger or ram into the annular space before mentioned and thence from the cylinder through the pipe 59.

In order to prevent the flat lower end of the plunger or ram from seating directly upon the bottom of the cylinder, which would prevent the water or other liquid under pressure from entering between them for producing the initial upper movement of the plunger or ram, the cylinder is provided with a plurality of inwardly extending lugs 62 which form stops for limiting the downward movement of the plunger or ram and leave between the bottom of the plunger or ram and the bottom of the cylinder a space for receiving the water or other liquid under pressure for producing the upward movement of the ram. In fact it is simply necessary to make the bottom of the plunger or ram and the bottom of the cylinder of non-complementary shape leaving spaces between them at the lower ends of the ducts or passages.

Having thus described my invention, what I claim as new therein and desire to secure by Letters Patent is:

1. In an amusement device, the combination of a platform having a floor and a guard wall around it, and a support engaging the platform centrally and upon which the platform tilts or oscillates, universally.

2. In an amusement device, the combination of a platform having a floor and a guard wall around it, a support engaging the platform centarlly, upon which the platform tilts or oscillates universally and a track upon which the lowermost side of the platform rests when in tilted or inclined position.

3. In an amusement device, the combination of a platform having a floor and a guard wall around it, a support engaging the platform centrally, upon which the platplatform tilts or oscillates universally, and means for raising and lowering the support.

4. In an amusement device, the combination of a platform having a floor and a guard wall around it, and a lifting device having a plunger the upper end of which engages the platform centrally and forms a support therefor upon which the platform tilts or oscillates universally.

5. An amusement device having, in combination, a circular platform, a support engaging the platform centrally and upon which the platform tilts or oscillates universally, means for raising and lowering said support, and a track upon which the platform bears throughout when in its lowermost position and at a single point when in tilted or inclined position.

6. An amusement device having, in combination, a platform, a wear-ring on the platform, a track ring upon which the wear-ring bears throughout when the platform is in its lowermost position and at a single point when the platform is in tilted or inclined position, and a lifting jack having a plunger engaging the platform centrally and constituting a support therefor upon which the platform tilts or oscillates universally.

7. An amusement device having a platform, said platform having a ring forming an outer sill, a centrally located post having at its lower end a flared socket, horizontal beams radiating from the post and having their inner ends secured to the upper end of the post and their outer ends secured to the sill, diagonal braces having their inner ends secured to the flared socket of the post and their outer ends secured to the horizontal beams, a floor laid upon said horizontal beams, and a support the upper end of which projects into and engages the socket upon which the platform is adapted to tilt or oscillate universally.

8. An amusement device having a platform, said platform having a ring forming an outer sill, a centrally located post having at its lower end a flared socket, horizontal beams radiating from the post and having their inner ends secured to the upper end of the post and their outer ends secured to the outer sill, diagonal braces having their inner ends secured to the flaring socket of the post and their outer ends to the horizontal beams, a floor laid upon said horizontal beams, a support the upper end of which projects into and engages said socket, and upon which the platform is adapted to tilt or oscillate, universally, and means for raising and lowering the support.

WILLIAM H. STRICKLER.

Witnesses:
H. C. HILL,
L. M. HOPKINS.

---

Copies of this patent may be obtained for five cents each, by addressing the "Commissioner of Patents, Washington, D. C."